Nov. 16, 1965    I. JEPSON    3,217,824
ELECTRIC LAWN MOWER WITH IMPROVED GROUNDING MEANS
Original Filed May 28, 1956
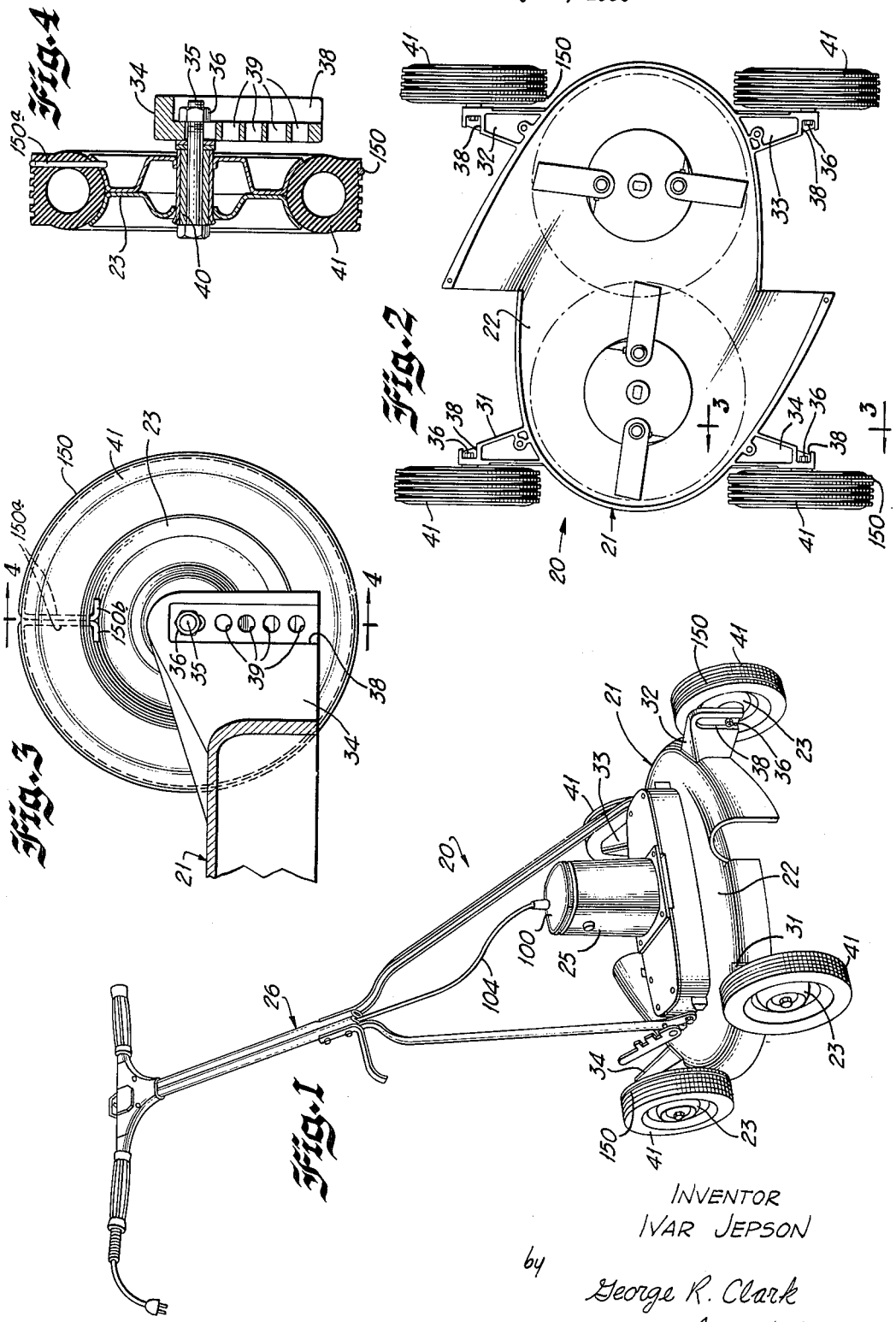
INVENTOR
IVAR JEPSON
by George R. Clark
ATTORNEY United States Patent Office 3,217,824
Patented Nov. 16, 1965

3,217,824
ELECTRIC LAWN MOWER WITH IMPROVED
GROUNDING MEANS
Ivar Jepson, 547 Linden Ave., Oak Park, Ill.
Application July 6, 1959, Ser. No. 825,255, now Patent
No. 3,028,719, dated Apr. 10, 1962, which is a division
of application Ser. No. 574,489, Mar. 28, 1956, now
Patent No. 2,926,478, dated Mar. 1, 1960. Divided and
this application May 11, 1961, Ser. No. 109,380
3 Claims. (Cl. 180—65)

The present invention relates to lawn mowers, and, more specifically, to power lawn mowers of the type in which a suitable prime mover is associated with the lawn mower to drive the cutting mechanism. Specifically, the present application is a division of application Serial No. 825,255, filed July 6, 1959, now Patent No. 3,028,719, which in turn, is a division of parent application Serial No. 574,489, filed March 28, 1956, now Patent No. 2,926,478.

In recent years there has been a tremendous increase in the demand for power lawn mowers. This has been brought about for several reasons. First of all, with the high cost of labor, the householder finds it difficult to get help to mow lawns, and, secondly, the power operated lawn mower has been made available at prices which make it attractive to the ordinary householder. As a matter of fact, at the present time more than a million power operated lawn mowers are sold every year.

Power operated mowers employing an electric motor as the prime mover thereof, unless a battery or other self-contained source of electric energy is connected to the motor, require connection with an external source of electrical energy, and consequently require a power cord of substantial length to permit mowing a lawn of any size. It would be desirable to provide an electric motor driven power lawn mower in which the problem of handling a mowing operation without cutting the cord is completely eliminated. A power operated lawn mower should also be relatively light in weight so that it can be handled without difficulty by women. Consequently, it would be desirable to provide a simple construction having relatively few parts, of lightweight material, thus providing a lightweight device and furthermore insuring a device which will give long years of trouble-free service.

Although it is generally not desirable to mow lawns when the grass is wet, sometimes this becomes necessary due to weather conditions which are not conducive to satisfactory lawn mowing. It is common practice for power operated lawn mowers to be supported on suitable wheels provided with rubber tires, thereby doing a minimum amount of damage to the lawn surface. However, such rubber tires insulate the mower structure from the ground, and if there should be some damage to the electrical circuit, the source voltage or at least some leakage current might be applied to the lawn mower. It would be desirable in a power operated lawn mower having rubber-tired wheels to assure grounding of the mower structure at all times whenever the mower is supported from the wheels, thus eliminating any shock.

Accordingly, it is an object of the present invention to provide a new and improved power operated lawn mower having the desirable feature set forth above.

It is a further object of the present invention to provide a power operated lawn mower supported on rubber-tired wheels in which improved means for grounding the mower are provided.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of a power operated lawn mower built in accordance with the present invention with the wheels adjusted for maximum height of cut;

FIG. 2 is a bottom view of the lawn mower of FIG. 1;

FIG. 3 is an enlarged inverted sectional view taken on line 3—3 of FIG. 2 but with the wheel shown in the position the wheels adjusted for maximum height of cut;

FIG. 4 is a sectional view taken on line 4—4 of FIG. 3.

Briefly, the present invention is concerned with a lightweight, electric powered lawn mower. The lawn mower is provided with improved means to ground the platform even though supported on rubber-tired wheels.

Referring now to the drawings, there is illustrated a lawn mower, generally indicated at 20, which comprises a carriage 21, including a housing or support 22 suitably supported on ground wheels 23. Mounted on the carriage 21 is a prime mover, generally designated as 25, specifically indicated as an electric motor. For the purpose of guiding the carriage, there is included a handle assembly, generally designated at 26, which handle assembly is pivotally associated with the carriage 21.

The details of the power operated lawn mower are fully disclosed in Patents Nos. 2,926,478 and 3,028,719 from which this application is derived, and the disclosures of those patents are incorporated herein by reference.

For the purpose of supporting the carriage 21 for movement over the area to be mowed, the housing 22 is provided with integral arms projecting from what might be called the four corners thereof. As a matter of fact, the arms designated as 31, 32, 33 and 34 effectively define four corners of the housing 22. The wheels 23 are secured one to each of the respective arms 31, 32, 33 and 34 by suitable wheel axle bolts 35 and associated nuts 36, best shown in FIGS. 3 and 4 of the drawings. As there illustrated, each arm such as 34, for example, is provided with a recess 38 within which are provided a plurality of vertically spaced openings 39 for receiving the associated wheel axle bolt 35.

As best shown in FIG. 4 of the drawings, each wheel 23 is provided with a centrally disposed wheel axle sleeve 40 serving as a suitable bearing to receive the associated wheel axle bolt 35. Preferably and as illustrated, the wheels 23 are provided with rubber tires indicated at 41, thus providing an arrangement which is relatively noiseless when moving on a hard surface such as a sidewalk and which will do a minimum of damage to a lawn, and which furthermore also provides a pleasing appearance.

To operate electric motor 25, it is, of course, necessary to connect electrical power thereto. To this end there is provided a power cord 104 which preferably enters the motor housing through an opening in the top of the cover 100.

In order that any damaged insulation to the power cord which might cause the line voltage to be applied to the mower 20 will not result in an electrical shock to the operator, means are provided to insure that the lawn mower 20 is grounded at all times. To this end a grounding wire is provided for two of the wheels 23, preferably diagonally positioned wheels. Thus, as is clearly shown in FIGS. 1, 2, 3 and 4 of the drawings, a grounding wire 150 is disposed in a groove in the associated tire 41 so as to project beyond the periphery of the tire and always be in engagement with the ground. Preferably, the grounding wire 150 has the ends thereof projecting laterally through an opening in the tire and the wheel, as designated at 150a, in FIG. 3 of the drawings. The ends of the lateral projections 150a extending through the wheel are further deformed laterally as indicated at 150b so as to make electrical contact with the wheel 23, which, of course, is electrically connected through the metal connections with the lawn mower proper. Thus, with this arrangement, even though a rubber-tired mower is employed, a satisfactory ground is always assured. By employing the grounding wire on two wheels diagonally mounted on the mower, such grounding connection is insured even though the front end or the back end of the mower is tipped up, which is sometimes necessary when going over curbs or the like. Preferably, the grounding wire 150 is formed of stainless steel. With this arrangement the operator need not worry about a short circuit and resultant shock if the mower is left out in the rain. There is no danger of even a slight shock which is common with other electric lawn mowers.

The operation of the present invention will readily be understood, in view of the detailed description included above, and no further discussion is included herewith.

While there has been illustrated and described what is at present considered to be a preferred embodiment of the present invention and a single modification thereof, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A lawn mower comprising a carriage, a plurality of wheels supporting said carriage, resilient electrical insulating material defining tires for each of said wheels, an electric motor supported on said carriage, a power cord connected to said motor for energizing said motor from a source of electrical energy, conducting means comprising a wire ring encompassing the circumference of at least one of said tires and secured thereto so that said ring is in continuous engagement with a supporting surface when said one tire is rotated in response to normal movement of said carriage over said surface, and means for electrically connecting said conducting means to said carriage whereby any electrical potential applied to said carriage by virtue of said power cord is grounded to said supporting surface through said conducting means.

2. The lawn mower of claim 1 wherein said tire is provided with a circumferential groove and said wire ring is disposed within said groove but projecting above the surface of said tire defining the maximum circumference thereof.

3. The lawn mower of claim 1 wherein two pairs of wheels are provided and said conducting means is applied to two wheels comprising a different one of each pair.

References Cited by the Examiner
UNITED STATES PATENTS

| | | | |
|---|---|---|---|
| 913,943 | 3/1909 | Brown | 280—47.34 |
| 1,411,998 | 4/1922 | Grace et al. | 191—63 X |
| 1,545,672 | 7/1925 | McArthur | 317—2 |
| 1,797,545 | 3/1931 | Churcher | 152—151 |
| 1,859,343 | 5/1932 | Rouge | 152—151 |
| 1,868,347 | 7/1932 | Cloud | 56—25.4 |
| 2,074,958 | 3/1937 | Chirelstein | 339—105 |
| 2,309,741 | 2/1943 | Woodward | 339—105 |
| 2,524,163 | 10/1950 | Criss | 191—1 X |
| 2,535,457 | 12/1950 | Roberts | 280—47.34 |
| 2,559,897 | 7/1951 | Phelps | 56—25.4 |

A. HARRY LEVY, *Primary Examiner.*

CARL W. ROBINSON, PHILIP ARNOLD, *Examiners.*

UNITED STATES PATENT OFFICE
CERTIFICATE OF CORRECTION

Patent No. 3,217,824                 November 16, 1965

Ivar Jepson

It is hereby certified that error appears in the above numbered patent requiring correction and that the said Letters Patent should read as corrected below.

In the grant line 3, after "Illinois," insert -- assignor to Sunbeam Corporation, of Chicago, Illinois, a corporation of Illinois, --; line 12, for "Ivar Jepson, his heirs" read -- Sunbeam Corporation, its successors --; in the heading to the printed specification, line 4, for "Ivar Jepson, 547 Linden Ave., Oak Park, Ill." read -- Ivar Jepson, Oak Park, Ill., assignor to Sunbeam Corporation, Chicago, Ill., a corporation of Illinois --.

Signed and sealed this 10th day of January 1967.

(SEAL)

Attest:

ERNEST W. SWIDER
Attesting Officer

EDWARD J. BRENNER
Commissioner of Patents